United States Patent Office 2,875,222
Patented Feb. 24, 1959

2,875,222

DRY RENDERING OF FATS

Henry C. Dormitzer, Chicago, Ill., assignor to Wilson & Co., Inc., a corporation of Delaware No Drawing. Application July 12, 1952
Serial No. 298,631

3 Claims. (Cl. 260—412.6)

The present invention relates to improvements in processes for the dry rendering of fats.

In accordance with the present invention, the materials to be rendered are subjected to treatment and the fat separated without involving the extended holding periods and cleaning difficulties of the processes as heretofore carried out, and at the same time a cleaner and lighter fat of higher grade is secured. In the trade, the fat rendered from beef and sheep animals is designated "tallow" and that from hogs is designated "grease." In the present application the term "fat" is used generically to refer to either.

In processes of dry rendering as hitherto carried out, the materials to be rendered are fed into a cooker, which is ordinarily a steam-jacketed, horizontal vessel provided with an agitator. These materials may be, for example, packing house viscera, bones or other materials which contain fatty tissues, and are generally washed and cut up or hashed prior to rendering. They are then cooked with agitation to effect separation of the fat, the cooking being continued until the material is approximately dry; that is, until it contains in the order of 7 to 8% of water. If cooking is continued to effect a greater removal of moisture, the fat is darkened; and if the residual moisture is materially greater than 7 to 8%, the cracklings are not readily pressable by the ordinary processes.

The cooked mass is then dumped into a steel box or tank having a perforated false bottom, commonly called the percolating box. Some fat drains off, leaving the cracklings which, at this stage, are accompanied by 30 to 35% of the fat. The cracklings are then fed to presses, either with or without preliminary grinding, and the fat is expressed. The presses, as customarily employed, are hydraulic presses or screw expellers. The fat which is expressed from the cracklings, and which usually carries up to about 2% of solid matter or settlings, is customarily run to a settling tank and allowed to settle 24 hours or longer, at temperatures of 175 to 200° F. In some cases, settling may be facilitated by agitating the fat while spraying water into it and heating it to maintain its temperature. This effects hydration of the protein matter of which the settlings are largely composed, and facilitates settling, the water settling out with the settlings. The fat is pumped off or decanted from the settling tank and mixed with the fat which has drained off from the percolating box and the mixed fat is then washed or filtered to clarify it. In filtration, suitable filter aids are employed in amounts ranging from 0.5 to 2%, and there is a considerable loss of fat in the filtering process.

After the fat or tallow has been removed from the settling tanks, the settlings are removed. This is a difficult and unpleasant operation, particularly where hydration is not employed, since the settlings form a gluey mass and must be removed by hand shoveling. When hydration is employed, the settlings and the accompanying water are drawn off to the sewer and any residual fat or other values in the settlings are lost.

The settlings, which are largely proteinaceous in character, as removed when the hydration step is not employed, contain some recoverable fats and are reheated separately to effect its removal or may be added to a fresh batch of material going through the cooker for rendering. The settling operation results in increased degradation of the fat in causing discoloration and increase in free fatty acid content.

In accordance with the present invention, the prolonged percolating and settling periods as customarily employed are dispensed with, as is the problem of cleaning or removing the settlings from the settling tanks. The fat or tallow is secured in higher yield and in better quality, being lighter and lower in fatty acids than that secured in the processes as hitherto employed.

In carrying out the present invention, the fat-containing packing house materials are rendered as in prior practice. The cooked or rendered mixture is removed from the cookers, and if it contains large bones, is run through a mill so as to reduce the size of the pieces to about two inches or less in their maximum dimension. The entire mass, including the fat and cracklings, is then passed while hot through a horizontal solids-handling centrifuge, which may be either cylindrical or conical, and which is suitably of the type provided with a rapidly rotating bowl containing a screw rotating at a different rate of speed, generally less than that of the bowl, to advance the separated solids to one end of the bowl, where it is discharged. Solids-handling centrifuges of this character, are, for example, those known as the Sharples Super-D-Canter and the Bird Continuous Centrifugal Filter. The fat is discharged from the solids-handling centrifuge and the solids or cracklings are separately discharged. They contain substantially less fat than the cracklings as recovered from the settling operation of the processes hitherto employed, generally in the order of 15 to 20% or somewhat less.

These low-fat cracklings are then passed to a press or expeller to express the fat or tallow in the same manner as is customary in the prior art, at temperatures such as to maintain the fat in fluid condition. The fat thus expressed is returned directly to the solids-handling centrifuge to pass therethrough with additional renderings from the rendering operation, and any solid matter contained in the expressed fat or tallow is there removed with the crackling. The solid matter remaining after the expressing operation, as in the prior known processes, contains 8 to 10% fat and is called "dry rendered tankage." It may be used, for example, in the preparation of poultry and hog feed.

The fat derived from the solids-handling centrifuge is, in the process of the present invention, a higher grade product, of lighter color and lower content of free fatty acids than the fats derived from the dry rendering process as hitherto conducted, and as removed from the centrifuge, is practically free of solid matter. If desired, the fat may be further clarified by filtration with very small amounts of filter aids, say in the order of 0.5% or less, or by means of the usual centrifugal clarifying devices.

By operating in accordance with the present process, much reheating of the fat and in particular the long period of high temperature settling, with its deteriorating effects, is avoided. The arduous and disagreeable cleaning and handling problems of the prior processes are likewise avoided. The fat product is of superior quality, both as to color and content of free fatty acids, as has been pointed out hereinbefore.

I claim:

1. The process for the removal of fat from fat-containing packing house material by a dry rendering process which comprises the steps of cooking the said packing house materials to render the fat therefrom, subjecting the resulting mixture while hot to centrifugal action, thereby separating the liquid fat from cracklings and reducing the fat content of the latter to not over 20%, expressing the fat from the cracklings to leave a residue containing 8 to 10% fat, and returning the expressed fat to be subjected to centrifugal action with additional materials from the rendering operation and removing the total fat separated in said centrifugal operation.

2. The process for the removal of fat from fat-containing packing house material by a dry rendering process which comprises the steps of cooking the said packing house materials to render the fat therefrom and reduce the moisture content to about 7 to 8%, subjecting the resulting mixture while hot to centrifugal action, thereby separating the liquid fat from cracklings and reducing the fat content of the latter to not over 20%, expressing fat from the cracklings to leave a residue containing 8 to 10% fat, and returning the expressed fat to be subjected to centrifugal action with additional materials from the rendering operation and removing the total fat separated in said centrifugal operation.

3. The process for the removal of fat from fat-containing packing house material by a dry rendering process which comprises the steps of cooking the said packing house materials to render the fat therefrom, subjecting the resulting mixture while hot to centrifugal action, thereby separating liquid fat from cracklings, mechanically expressing fat from the cracklings, and returning the thus expressed fat to be subjected to centrifugal action with additional materials from the rendering operation and removing the total fat separated in said centrifugal operation.

References Cited in the file of this patent

UNITED STATES PATENTS

| | | |
|---|---|---|
| 1,328,278 | Gavin | Jan. 20, 1920 |
| 1,826,987 | Burt et al. | Oct. 13, 1931 |
| 2,467,529 | Hormel | Apr. 19, 1949 |
| 2,614,110 | Davis | Oct. 14, 1952 |

FOREIGN PATENTS

| | | |
|---|---|---|
| 292,327 | Great Britain | June 22, 1928 |